United States Patent [19]
Schoch

[11] Patent Number: 5,973,609
[45] Date of Patent: Oct. 26, 1999

[54] COMMUNICATION SYSTEM WITH ADAPTIVE MEDIA ACCESS CONTROL

[75] Inventor: Kevin Schoch, Shaker Heights, Ohio

[73] Assignee: Telxon Corporation, Akron, Ohio

[21] Appl. No.: 08/056,739

[22] Filed: Apr. 30, 1993

Related U.S. Application Data

[63] Continuation of application No. 07/849,796, Mar. 11, 1992, abandoned, which is a continuation of application No. 07/514,649, Apr. 25, 1990, abandoned.

[51] Int. Cl.$^6$ .................................................. H04Q 1/00
[52] U.S. Cl. ........................................ 340/825.08; 370/449
[58] Field of Search ..................... 340/825.02, 825.06, 340/825.08, 825.5, 825.52, 825.54, 827; 370/449

[56] References Cited

U.S. PATENT DOCUMENTS

| | | | |
|---|---|---|---|
| Re. 32,516 | 10/1987 | Cantwell, Jr. ........................... | 370/89 |
| 3,755,781 | 8/1973 | Haas et al. ......................... | 340/825.08 |
| 4,071,908 | 1/1978 | Brophy et al. ..................... | 340/825.02 |
| 4,161,786 | 7/1979 | Hopkins et al. ......................... | 364/900 |
| 4,379,294 | 4/1983 | Sutherland et al. ................. | 340/825.5 |
| 4,439,856 | 3/1984 | Ulug ......................................... | 370/85 |
| 4,495,493 | 1/1985 | Segarra et al. ...................... | 340/825.5 |
| 4,528,663 | 7/1985 | Citta ....................................... | 370/85.2 |
| 4,667,193 | 5/1987 | Cotie et al. ........................ | 340/825.08 |
| 4,713,805 | 12/1987 | H enaff .................................... | 370/85 |
| 4,733,390 | 3/1988 | Shirakawa et al. ....................... | 370/85 |
| 4,763,320 | 8/1988 | Rudolph et al. ........................ | 370/473 |
| 4,858,232 | 8/1989 | Diaz et al. ............................... | 370/86 |
| 4,940,974 | 7/1990 | Sojka ................................. | 340/825.08 |
| 4,979,118 | 12/1990 | Kherádpir ............................... | 340/827 |
| 5,103,445 | 4/1992 | Östlund .............................. | 340/825.08 |

OTHER PUBLICATIONS

"Tekscan 9020 'Super–Base' Radio–Link Network Controller," *Identification Journal*, Mar. 1989, p. 18.

*Primary Examiner*—Brian Zimmerman
*Attorney, Agent, or Firm*—Renner, Otto, Boisselle & Sklar, P.L.L.

[57] ABSTRACT

A communication system includes data terminals and controllers. The controllers have distinct areas of responsibility in which they communicate with particular data terminals. The controllers map data terminals to groups and grant transmission time to each group in turn by polling. The controllers map the terminals to groups having a minimum number equal to a single terminal, corresponding to straight polling, and a maximum number equal to the total number of terminals in the system, corresponding to a singly-slotted ring, and dynamically change the group sizes and mappings in response to the system activity.

26 Claims, 3 Drawing Sheets

COMMUNICATION SYSTEM WITH ADAPTIVE MEDIA ACCESS CONTROL

This application is a continuation of application Ser. No. 07/849,796, filed Mar. 11, 1992 now abandoned, which is a continuation of application Ser. No. 07/514,649, filed Apr. 25, 1990, now abandoned.

BACKGROUND OF THE INVENTION

1. Field of the Invention

This invention relates generally to communication systems, and more particularly to systems having many data terminals transmitting data under controlled access to a transmission medium.

2. Description of the Related Art

In a communication system, many users must be allocated transmitting time to transfer their data or voice over a transmission medium. The transmission medium comprises a communication channel divided into time slots that are allocated among the users by a central controller. The time slots can be allocated on the basis of a contention protocol procedure, which is similar to a first-come, first-served rule, where users are granted time as they request it. If a user requests the channel and it is not available (i.e., the channel is in use), then the user must wait for a time interval and attempt again. As the system becomes active, two users might attempt to transmit over the channel at the same time, and a data collision will occur. This forces the users to retransmit or wait for a time interval before transmitting again, and may result in the users finding the channel unavailable when again attempting to transmit.

As an alternative to a contention protocol, users can be allocated time slots on the basis of a polling protocol procedure, in which all users are guaranteed access to the channel on a regular basis, each user being polled, or granted transmitting time, in sequence. Each user who requires transmission time must wait its turn. Under a polling protocol, a user might be forced to wait for its turn even if no other user in the system has data to transmit, because the other users are being polled. Each user must wait until it is polled to indicate whether or not it has data for transmission. A certain amount of such waiting time is inevitable under a polling protocol, and is referred to as the polling overhead of a polling protocol procedure. Those skilled in the art will appreciate that a contention protocol is efficient for lightly-loaded systems, or networks, and is inefficient for busy networks, while a polling protocol works efficiently with crowded, busy networks but is inefficient with lightly-loaded networks.

It is known to provide communication systems with hybrid protocol procedures, in which users are divided into groups and the groups are polled, while the users within a polled group then decide who among them transmits on the basis of a contention protocol. In this way, groups of users are guaranteed transmitting time on a regular basis. Dividing the users into polled groups reduces the amount of polling overhead and risk of data collision. The assignment of users to particular groups, and the size of the groups, is a compromise based on trade-offs between the polling overhead and the contention waiting time or rate of data collisions.

Many communication systems experience fluctuating usage rates, in which the system is lightly loaded for certain intervals of time, in between which the system becomes heavily loaded with many users seeking to transmit. For such systems, neither the polling protocol nor contention protocol is optimal. Hybrid protocol systems can be an improvement, but often the need for access to the network will fluctuate in unpredictable ways, or the distribution of users requiring access to the transmission medium at any one time can change throughout the network, making the assignment of users to groups and the size of the groups not optimal.

It should therefore be appreciated that there is a need for a communication system that capitalizes on the advantages of a contention protocol, when the network is lightly loaded, and of a polling protocol, when the network is crowded and busy. The present invention satisfies this need.

SUMMARY OF THE INVENTION

The present invention provides a communication system in which the protocol control for data transmission is dynamically changed from a contention protocol to a polling protocol and to intermediate combinations of the two in response to the data transmission needs of the system's users. This allows the protocol control to be dynamically changed as the communication system changes from a lightly loaded network with only a few users transmitting data to a crowded network in which many of the network's users are attempting to transmit data. In accordance with the present invention, when many users are attempting to transmit (that is, the system is heavily loaded), a polling protocol is used in which each user is granted time in sequence. When the system becomes less heavily loaded, users are divided into groups that are then polled, the size of the groups being selected on the basis of the number of users having data to transmit. When the system is lightly loaded, all of the users are assigned to one large group, in effect adopting a contention protocol. Thus, the communication system is capable of a polling protocol, a contention protocol, and intermediate combinations of the two, all in response to the loading of the system communication channel.

In accordance with the present invention, a communication system includes a plurality of data terminals that transmit their data over a radio frequency channel to a controller in accordance with polling by the controller. The controller effectively assigns data terminals to polling groups based on the number of data collisions that occur, and dynamically adjusts the number of groups as the number of collisions changes. Each data terminal can transmit data only when its group is polled, and cannot transmit out of turn because of a polling signal transmitted by the controller. A polling cycle is completed by the controller when all groups have been polled. Data can be downloaded from the controller to the data terminals at the end of polling cycles. In addition, the controller can be connected to a host computer, and communicates with the host computer at any time, as needed.

The system can include more than one controller, but each controller is associated with a limited area of coverage over which it can communicate with the data terminals. The controller is informed of the terminals that are active in its area. Each terminal can be switched on or off and can move in and out of the area of a controller. Each data terminal is assigned a unique terminal identification number when the system is initially configured. As data terminals are switched off or leave the area of a controller, they are logged off, and as terminals are switched on or enter a controller's area, they are logged on. The controller is also continuously informed of the number of data collisions that occur over the channel. In this way, the controller is fully informed of the system status and can intelligently make group assignment decisions.

The controller is informed of all possible terminal identification numbers with which it might communicate. The controller maps the set of terminal identification numbers to a set of terminal group numbers, which it selects based on the system status. The terminal group numbers define the polling cycle of the controller, in which each group in turn is granted access to the communication channel. Each data terminal then decides which terminal group it is a member of and determines when its group is being polled, attempting to transmit data only when its group is polled and remaining silent otherwise. The controller can dynamically change the mapping of data terminals to groups, increasing or decreasing the number of groups among which the terminals are mapped.

Finally, the system can be provided with multiple data transmission frequencies, or channels, that increase the flexibility of the system and increase the amount of data that can be transmitted. In such a system, data terminals that are switched on or enter the area of a new controller hunt for the first available frequency in which to transmit their data, and multiple controllers are each assigned to one of the frequencies.

Other features and advantages of the present invention should become apparent from the following description of the preferred embodiment, which illustrates by way of example the principles of the invention.

BRIEF DESCRIPTION OF THE DRAWINGS

The invention will now be described with reference to the accompanying drawings, in which like reference numerals refer to like elements.

DESCRIPTION OF THE PREFERRED EMBODIMENTS

The following description is not to be taken in a limiting sense, but is made merely for the purpose of illustrating the general principles of the invention. The following detailed description is of the best modes presently contemplated of carrying out the present invention.

Figure 1:
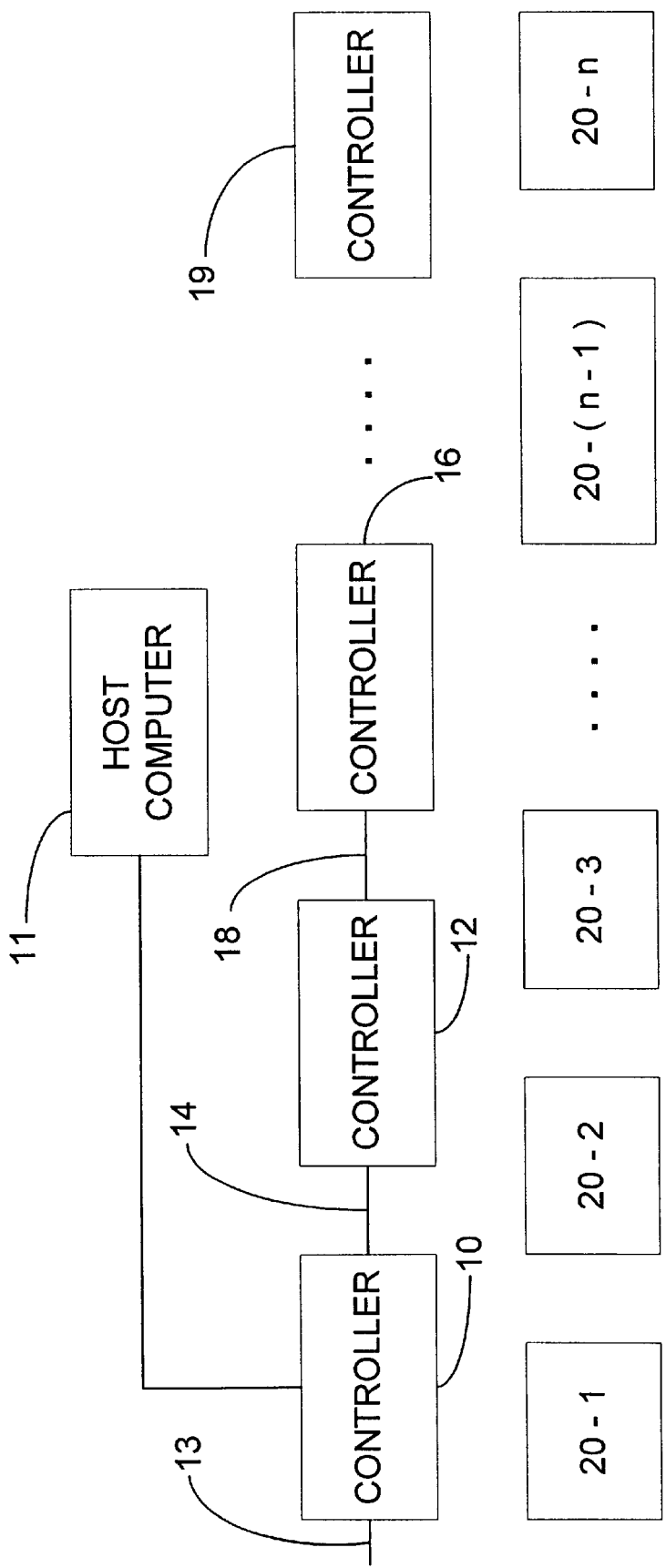
FIG. 1 is a block diagram of a communication system in accordance with the present invention.

The communication system illustrated in FIG. 1 includes a first controller 10 connected to a second controller 12 via a data line 14, and a third controller 16 connected to the second controller via a data line 18. Additional controllers, one of which is depicted at 19, are connected in a similar manner, that is, serially. The first controller may be connected to a last controller (not illustrated) via a data line 13, completing a network ring structure known to those skilled in the art. All of the controllers together might, for example, constitute a local area network (LAN) of computers known to those skilled in the art. One or more host computers 11 can be connected to one or more of the controllers 10. For simplicity, only one of the controllers 10 will be discussed with respect to the preferred embodiment.

A plurality of portable data terminals 20 are shown, individual data terminals being respectively identified by the reference numerals 20-1, 20-2, 20-3, and so on up to 20-n. The terminals are located in proximity to one of the controllers 10. The data terminals might comprise, for example, portable inventory control computers used in entering stock levels in a warehouse or store and typically would be distributed throughout the building. A data terminal user would then generate stock level data and the like organized into data messages that are sent to the controller.

Figure 2:
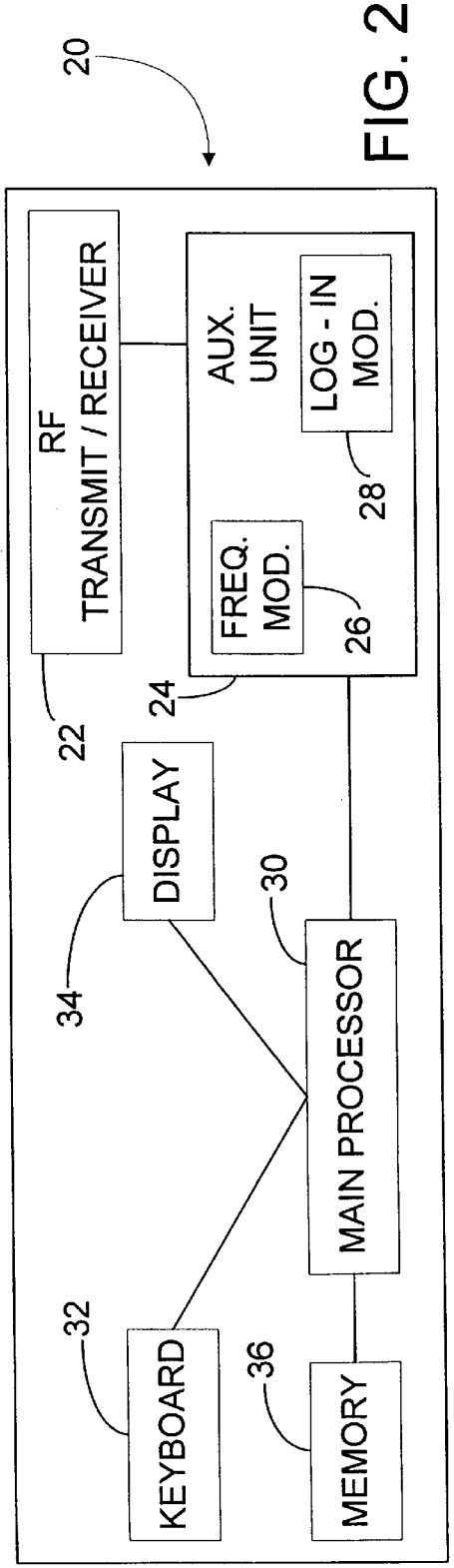
FIG. 2 is a block diagram of one exemplary data terminal in the communication system of FIG. 1.

As illustrated in FIG. 2, each data terminal 20 includes a radio frequency (RF) transmitter/receiver 22 that enables the terminal to transmit and receive data to and from one of the controllers 10. The radio frequency comprises a communication channel for the system. Each terminal is free to be moved about in the building around the controllers, but has a limited range within which it can transmit and receive data. The RF transmitter/receiver 22 is controlled by an auxiliary processing unit 24 that includes a frequency selection module 26 and a log-in module 28 described further below. The terminal also includes a main processor 30, a keyboard 32 for entering data, a display 34 for displaying data and system messages, and a memory 36. The main processor performs administrative tasks, and at an initial configuration accepts a unique terminal identification number associated with the terminal that it then stores in the memory. The set of all possible terminal identification numbers is defined by the user at the time the system is initially configured at a particular site or building.

Figure 3:
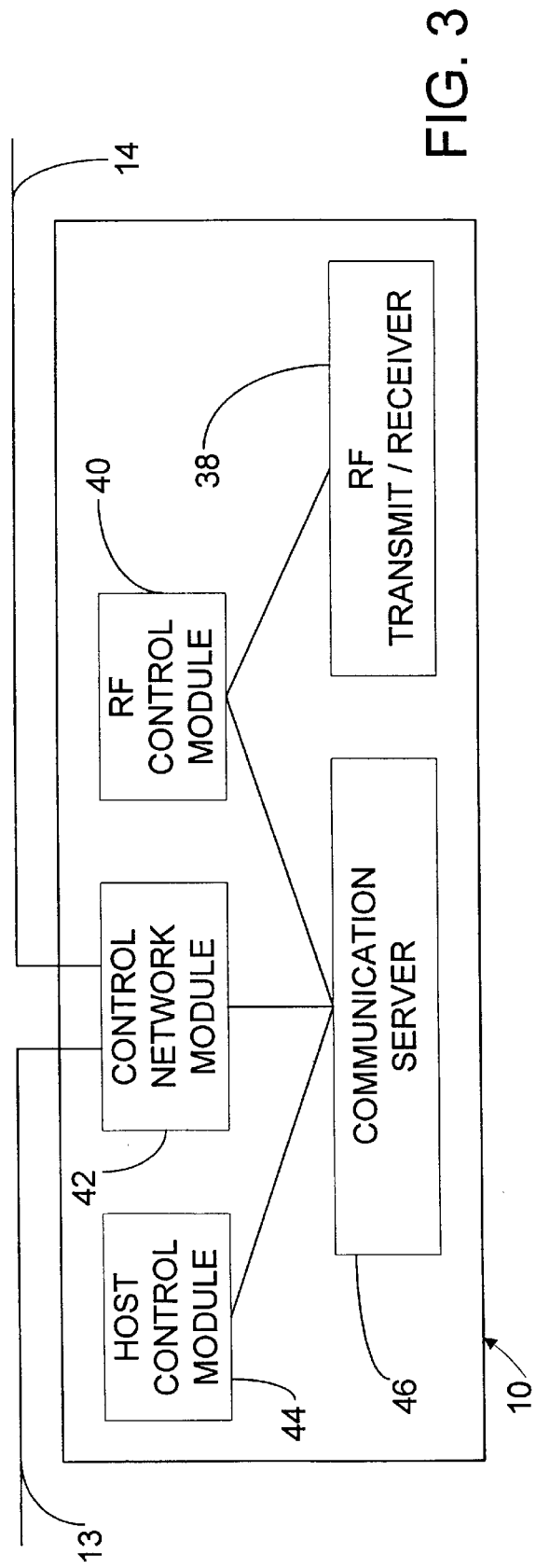
FIG. 3 is a block diagram of a controller in the communication system of FIG. 1.

As illustrated in FIG. 3, each controller 10 includes an RF transmitter/receiver 38, and has a limited range within which it can transmit and receive data. That is, each controller is associated with a geographically distinct area of RF coverage such that each data terminal can communicate with the particular controller associated with the geographic area within which the data terminal is located, but with no others. The controller transmitter/receiver 38 operates under control of an RF control module 40. The controller communicates with any other controllers in the system via a control network module 42 that might, for example, comprise part of a LAN module. The controller also can communicate with a host computer 11 via a host control module 44. Finally, the three modules 40, 42, and 44 of the controller operate under the supervision of a communication server 46, which also performs administrative tasks, such as accepting a controller identification number and keeping a controller clock.

In the preferred embodiment illustrated, the RF link between the data terminals 20 and each of the controllers 10 is preferably via a single frequency. That is, each controller is assigned a particular frequency over which it transmits and receives data, and communicates with the terminals. Each data terminal is associated with a unique terminal identification number that is assigned at the initial configuration of the communication system during installation at the warehouse or store.

The frequency, or communication channel, is divided into time slots. During any one time slot, only a specified number of terminals are allowed to transmit. During normal operation, the data terminals are dynamically associated with various terminal groups the size of which depends on the frequency of data transmissions, as described below. Each terminal group is granted access to the communication channel in turn, that is, each group is polled. A polling cycle is completed after all of the terminal groups have been polled. Because a terminal cannot transmit data unless its terminal group is being polled, it might have to wait for its time slot even if no other terminal has data to transmit. This waiting time is referred to as polling overhead.

When one of the controllers 10 is first switched on or activated, it assumes that all data terminals 20 are members of one large terminal group and initiates a polling signal, which indicates to any data terminal that receives the signal that the controller is available for receipt of a data transmission for a predetermined interval of time (a time slot). At the conclusion of the polling cycle, the controller can complete other processing, such as downloading data from the host computer 11 to the data terminals. Thus, the controller implements a time-division communication system.

Any data terminal 20 that receives the polling signal can respond with a data message that includes protocol data indicative of the system's operating state and its terminal identification number, as well as the data generated by the terminal user. After sending its data, each data terminal waits for an acknowledgment from the controller 10 with which it is communicating. If a data terminal receives an acknowledgment, it initializes a transmission attempt count to zero. If two data terminals send data close together in time, the two data messages might interfere or collide with each other, resulting in a failed transmission attempt for both terminals. That is, the controller will be unable to understand either data message. When this happens, neither terminal will receive an acknowledgment from the controller and both will increment their respective transmission attempt counts.

When a data collision occurs, each data terminal 20 will wait a random amount of time before checking for a polling signal and again attempting a data transmission. The procedure for waiting might comprise, for example, what is known as an exponential backoff algorithm, in which the amount of time allowed to elapse before the next transmission attempt, or re-try, can be one time unit, three time units, six time units, twelve time units, and so on to a predetermined limit. Because the preferred embodiment includes a controller that polls the terminals, the time units correspond to the controller's polling cycle.

Each time a data terminal 20 attempts a data transmission and fails, the terminal increments its transmission attempt count. This attempt count is part of the protocol data that is passed to the controller 10 with each data terminal's data message. If the transmission attempt count value exceeds a predetermined number, the controller increases the number of terminal groups by a factor of two. Thus, the controller will first increase the number of terminal groups from one to two, and then from two to four, and so on. Increasing the number of groups means that fewer terminals are polled at each polling signal, reducing the chance of a data collision at the cost of increasing the polling overhead. Similarly, if the attempt count value drops below a predetermined number or drops to zero, the controller decreases the number of polling groups by a factor of two. Decreasing the number of polling groups means that more terminals are polled at each polling signal, reducing the polling overhead but increasing the risk of data collisions. The attempt count value at which groups are increased and the value at which groups are decreased can be changed, depending on system operating needs and system configuration. The maximum number of groups allowed is equal to the total number of data terminals 20 in the system, which is known at the time of the initial system configuration, while the minimum number of groups allowed is one. Thus, the communication system provides an adaptive group polling scheme.

The controller 10 maintains a record, or a polling list, that contains the identification numbers of terminals 20 that are to be polled, and keeps a record of the terminal groups with which they are associated. The controller issues a polling signal for each terminal group, one after another in sequence beginning with a first group. When a terminal group is polled, the terminals who are members of the group contend for access to the channel in a manner similar to that of a singly-slotted ring. After issuing each polling signal, the controller waits for a predetermined time period for a terminal from the polled terminal group to respond. After the time period has expired, or timed out, with no response, the controller assumes no terminal in that group has data to send and moves on to the next terminal group on the list, issuing a polling signal for that group. When all terminal groups have been polled, completing the polling cycle, the controller can begin polling again with the first group.

The communication system in accordance with the present invention provides dynamic allocation of data terminals to terminal groups of varying size. For example, if each data terminal 20 is assigned to a separate group, and there are four terminals, then the following sequence of data transmissions might occur:

Controller 10 issues polling signal #1.
Data terminal 20-1 responds with a data transmission.
Controller acknowledges the transmission
Controller issues polling signal #2.
Time out occurs with no transmission from 20-2.
Controller issues polling signal #3.
Time out occurs with no transmission from 20-3.
Controller issues polling signal #4.
Data terminal 20-4 responds with a data transmission.
Controller acknowledges the transmission.
Controller issues polling signal #1, etc.

Thus, in this arrangement of groups, a data terminal must wait for a polling signal for its group before it can transmit data, even if intervening terminals have no data to transmit. This process, in which the number of terminal groups is equal to the number of data terminals, is known as straight polling.

For a lightly-loaded network, straight polling is inefficient. Therefore, the communication system begins with the controller 10 operating in what can be referred to as a singly-slotted ring, in which the number of terminal groups is the minimum number, one. Under this protocol scheme, the controller first issues an open polling signal to which any data terminal 20 can respond. A data terminal that has data to send first checks for data transmissions from other terminals. If no transmissions are detected, the data terminal sends its data message to the controller. If the data terminal receives an acknowledgment, it knows the data was successfully received. If no acknowledgment is received, the data terminal assumes that a data collision occurred with a transmission from another data terminal. The data terminal therefore begins its backoff algorithm before re-attempting and also increments its transmission attempt count. This configuration of one large terminal group, which is similar to a pure contention system, is efficient for lightly-loaded networks with little data transmission activity.

The communication system in accordance with the present invention also provides data terminal groupings between straight polling and the contention-like, singly-slotted ring, wherein there are multiple terminal groups and more than one terminal is associated with, or mapped to, each terminal group. As each terminal group is polled, its member data terminals contend for transmission in accordance with the contention protocol described above. For example, if the system contains sixteen data terminals and two terminal groups such that the terminals with an odd-numbered identification number are assigned to group #1 and the terminals with an even-numbered identification number are assigned to group #2, then the following sequence might occur:

Controller issues a polling signal for group #1.
Data terminal with identification number 20-3 sends data message.
Controller acknowledges the data transmission.
Controller issues a polling signal for group #2.
Data terminals with identification 20-2 and 20-6 transmit.
Data transmissions interfere; no acknowledgment sent.
Controller issues a polling signal for group #1.
No data terminal attempts transmission; time out occurs.
Controller issues a polling signal for group #2.
Terminal with identification 20-2 transmits.
Controller acknowledges the data transmission.
Controller issues a polling signal for group #1.
No data terminal attempts transmission; time out occurs.
Controller issues a polling signal for group #2.
Terminal with identification 20-6 transmits.
Controller acknowledges transmission.

Thus, this type of group polling provides an intermediate polling scheme between straight polling and a singly-slotted ring.

The RF control module 40 of a controller 10 controls the mapping of terminal identification numbers to terminal groups. That is, the controller associates each terminal identification number with one of the terminal group numbers it has selected, each group being associated with the same quantity of terminal identification numbers. Regardless of the number of terminal groups selected, the product of the number of terminal groups and the number of terminals in each group will always equal the total number of terminals in the system. The RF control module ensures that this mapping is carried out properly.

In accordance with the present invention, the RF control module 40 also checks the transmission attempt count received with every successful data transmission. If the attempt count exceeds a predetermined number, the RF control module increases the number of groups by a factor of two. Thus, in the example described above, if the attempt count received with the data transmission from either the data terminal with identification number 20-2 or 20-6 was greater than the predetermined number, then the number of groups would be increased from two to four. As the number of groups is changed, the data terminals are mapped to the different groups.

The RF control module advantageously maps the terminals to the terminal groups sequentially. That is, if there are two groups, then every other data terminal (1, 3, 5, etc. for the first group and 2, 4, 6, etc. for the second group) is mapped to the same group. If there are four groups, then every fourth data terminal is mapped to the same group (1, 5, 9, etc.; 2, 6, 10, etc.; 3, 7, 11, etc.; 4, 8, 12, etc.; and so on). This provides a better distribution of the terminals among the groups when compared with mapping consecutive blocks of terminals. For example, it might not be unusual for the terminals to be switched on or to transmit data messages in order of terminal identification number, with lowest numbers first. Thus, it would be much more likely that terminals 20-1 through 20-100 are busy rather than 20-1900 through 20-2000. In such circumstances, it should be appreciated that two terminal groups of 20-1 through 20-1024 and 20-1025 through 20-2048 would not reduce data collisions as well as two groups comprising even-numbered and odd-numbered terminals. Therefore, the sequential mapping of the present invention provides a better distribution.

A central feature of the communication system is that not only does the controller 10 have knowledge of the data terminal groups and mapping, but the data terminals 20 also have this knowledge. In this way, a data terminal knows when it can respond to a polling signal and when it cannot, and therefore does not try to contend for transmission out of turn. The controller communicates the grouping information to data terminals by sending a polling signal that includes a 16-bit address field 48 as shown in FIG. 4.

Figure 4:
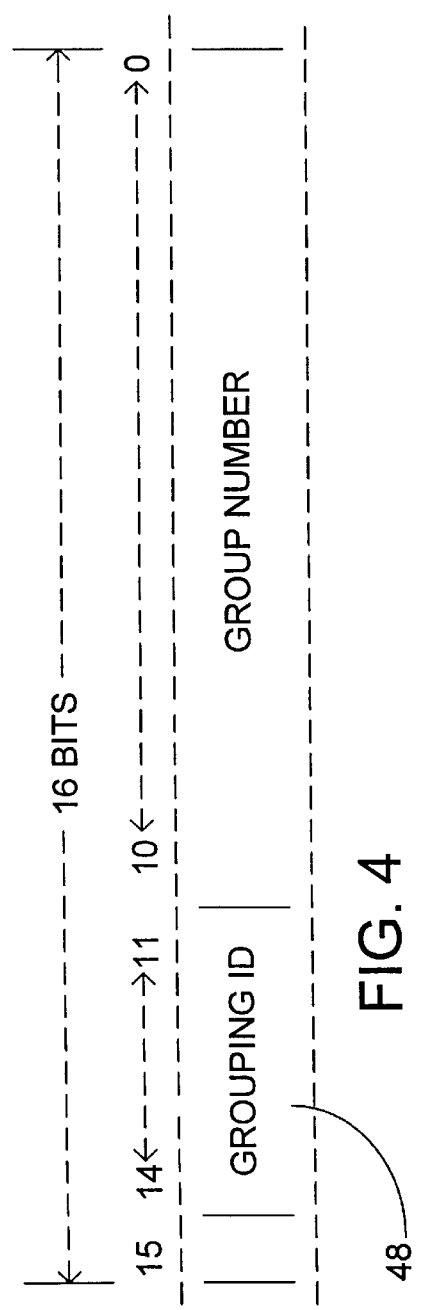
FIG. 4 is a representation of a polling signal address field.

As illustrated in FIG. 4, bits 14–11 of the polling signal address field 48 contain a grouping identification number, and bits 10–0 contain the group number, while bit 15 is unused. When a data terminal 20 receives the polling signal address field, its auxiliary processing unit 24 uses the grouping identification number as a mask to pick the proper number of significant bits in its terminal identification number to compare against the group number. If the terminal identification number and group number match, or are equal, then the data terminal knows that its terminal group is being polled by the controller 10 and that it can contend for transmission.

Because eleven bits (0 through 10) are allocated for the terminal identification number, the maximum possible number of terminals that can be active and under control of the controller is $2^{11}$ or 2048. Because the controller 10 increases terminal group sizes by factors of two, there are twelve possible groupings, beginning with one single terminal group (corresponding to $2^0$ or a singly-slotted ring), then 2 groups ($2^1$), 4 groups ($2^2$), and so on to the last group size of 2048 groups ($2^{11}$), where each data terminal 20 is assigned to its own group (corresponding to straight polling).

The number of bits picked off from the terminal identification number corresponds to the number of possible groups for a given mapping, or terminal grouping. Therefore, if there are two polling groups, only the first bit in the terminal identification number is significant. That is, if the identification number is even (bit 0 is 0), then the data terminal belongs to group one, and if the identification number is odd (bit 0 is 1), then the data terminal belongs to group two. Similarly, if the data terminals are mapped to one of four groups, then the first two bits of the terminal identification number are significant and the terminal must use the grouping identification number to pick off the first two bits of the terminal identification number to compare with the group number.

Figure 5:
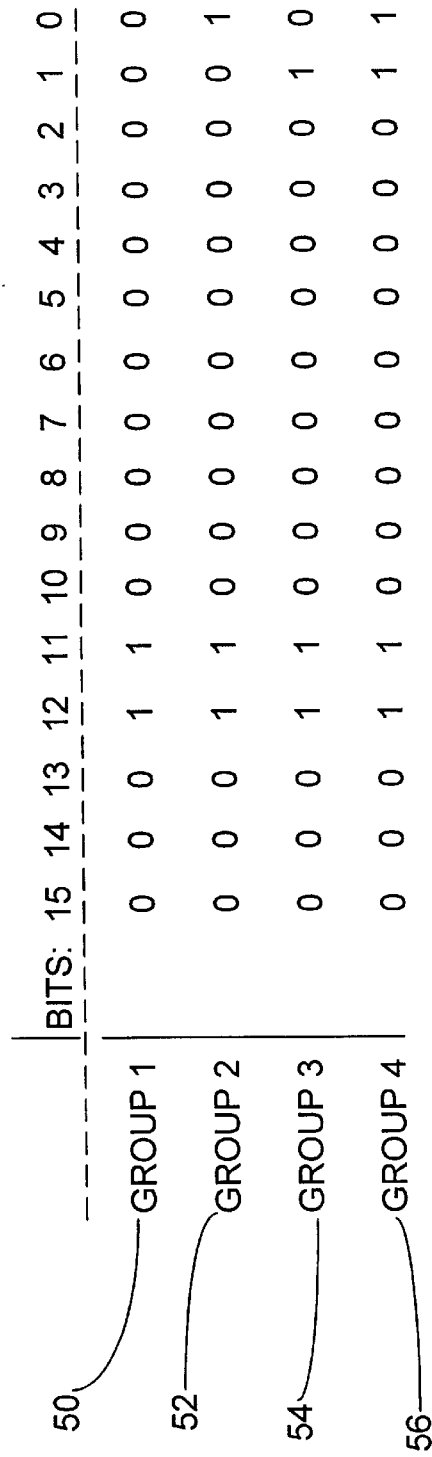
FIG. 5 is a representation of an address field for four polling signals and a data terminal identification number.

The address field for each of four polling signals 50, 52, 54, and 56, corresponding to a mapping with four groups of data terminals, is illustrated in FIG. 5. The first two bits 1–0 of each polling signal corresponds to a different terminal group. A terminal group is being polled when bits 1–0 of the polling signal correspond to the terminal's group number. Because there are four groups, the grouping identification number of bits 14–11 of each polling signal are set to pick off the first two bits of the terminal identification numbers. Also illustrated in FIG. 5 is the binary representation of the terminal identification number 58 for an arbitrary one of the data terminals 20, the one with identification number 1027. It is clear from FIG. 5 that the last two bits of 1027 are both one, and therefore the data terminal can determine that it belongs to terminal group four. That is, there will be no match between its terminal identification number and the group number of the address field in the polling signal unless the polling signal 56 is intended for terminal group number four. In this way, the data terminal will not attempt to transmit out of turn but will only contend for data transmission when its group is polled.

In the illustrated embodiment, the RF control module 40 of the controller 10 keeps track of each active data terminal 20 in the controller's geographic area of communication, and also keeps track of the amount of time since the last data transmission from each terminal. A data terminal is considered to be active if it has transmitted a data message within a predetermined time from the current time. In this way, the controller polls only those terminal groups containing at least one data terminal that has transmitted data within a predetermined time interval. Thus, if a data terminal has not transmitted data within the prescribed interval, the controller assumes the terminal has left the area or has been switched off, and the RF control module deletes that terminal from its list of active terminals. In this way, the system keeps track of the terminals as they are moved about.

The controller 10 will not waste time by polling a group that has no active terminals. As noted above, the maximum number of terminal groups for straight polling is equal to the number of data terminals 20. Therefore, when the controller deletes a terminal from its list of active terminals, it thereby effectively establishes a lower maximum for the number of terminal groups it will poll. This reduces the polling overhead and makes the system operate more efficiently, because even if the system is forced into a straight polling mode it will not waste polling slots on idle data terminals. Thus, a terminal group will not be polled unless at least one of its members is an active terminal.

The communication system in accordance with the present invention not only keeps track of data terminals 20 that have left the area of a controller 10 for that of another, it also keeps track of data terminals as they enter new areas or are switched on. Before a terminal can be listed as being active, it must first log-in with a controller. This increases efficiency, because a controller need not poll a data terminal group for which no terminals are logged in. The RF control module 40 of each controller follows each polling cycle with a log-in poll. That is, following the last group polling signal, each controller sends a log-in polling signal that the data terminals recognize as an open log-in signal to which all terminals can respond with a log-in data message. A terminal will not send a log-in message if it is already logged in with a controller. For every log-in message received, the controller places the associated terminal in an active status, where it remains until it is deleted as described above. When a controller 10 adds a terminal to its active list, the controller informs the other controllers 12, 16 of this fact via the data lines 14, 18. Any controller previously communicating with this terminal then deletes the terminal from its active list.

Each data terminal 20 decides when it is in communication with a controller 10 and when it has lost communication. Each polling signal, regardless of type, includes the controller's identification number. When a data terminal is switched on, it immediately listens for a log-in polling signal. When the terminal detects a log-in signal, the log-in module 28 of its auxiliary processing unit 24 directs the sending of a log-in message, which includes the terminal's identification number. The controller 10 then adds this terminal to its list of active terminals, whereupon it is logged in.

If a terminal 20 is taken outside the area of its previous controller 10, which knew of its presence, and is then within the area of a new controller 12, which is ignorant of its presence, the terminal will not receive a data acknowledgment following its transmissions, or might not be able to receive polling signals from the previous controller 10, or may receive polling signals with errors. Although the controller should be continuously polling, the terminal will attempt to transmit to its controller 10 in the chance that the controller is waiting for a log-in message. If no acknowledgment is received from the controller 10, the terminal will conclude that it has lost communication with its controller 10.

If a data terminal 20 is taken outside the range of a controller 10 and into a new area under the control of a different controller 12, it might begin receiving polling signals from the new controller 12. If the terminal concludes it has lost communication with its controller, it will attempt to log in with the new controller. When the new controller ends a polling cycle and sends a log-in signal, the terminal will respond with a log-in message. Upon receiving the log-in message, the new controller 12 will add the terminal to its list of active terminals. Thus, a terminal will conclude when it cannot communicate with its last known controller, and will attempt to log-in with a new controller with which it can communicate.

In another embodiment of the present invention, each terminal 20 has the capability of operating at more than one frequency, and each controller 10, 12, and 16 can be assigned a different frequency. Thus, the communication system can operate under frequency-division as well as time-division protocols. With such a configuration, the data terminals 20 must be able to switch between the frequencies as they move about the system. Therefore, the auxiliary processing unit 24 of each data terminal is provided with a frequency control module 26 that controls the frequency over which the data terminal RF transmitter/receiver 22 operates.

The frequency control module 26 allows the terminal 20 to listen for open polling log-in signals on a default operating frequency. If the log-in module 28 of the terminal receives no signal after a predetermined time interval, it then directs the frequency control module 26 to send a log-in message on that frequency on the chance that the controller is temporarily quiescent or waiting for a log-in message. If no acknowledgment is received after a predetermined time interval, the data terminal then switches to a second frequency and repeats the process. The data terminal repeatedly tries each of the frequencies at its disposal until it achieves log-in or reaches a predetermined limit, in which case it signals an error condition.

The communication system in accordance with the present invention also allows for a broad range of multivariate or multidimensional mappings of data terminals into terminal groups. The configuration previously described uses a two-dimensional mapping in which, for example, 2048 data terminals could be provided as one large group of 2048 terminals in a singly-slotted ring designated with the mapping notation (1, 2048), where the first variable or coordinate of the notation corresponds to the number of groups or polling intervals, which are polled in sequence through the polling cycle, and the second coordinate corresponds to the number of terminals in each group. Thus, in the two-dimensional mapping, groups could also be provided as two groups of 1024 designated as (2, 1024), or as four groups of 512 designated as (4, 512), and so on up to (2048, 1), which corresponds to straight polling. That is, a polling cycle constitutes selecting a particular mapping by selecting one of the possible (x, y) coordinate pairs, such as (4, 512), and then polling all groups in that mapping by selecting one coordinate and cycling through its possible values, such as x=1, 2, 3, 4 in this example.

Alternatively, a configuration referred to herein as a multivariate mapping could be used for the 2048 terminals, for example (2, 2, 512), in which any one of the coordinate variables, or axes, is selected for polling. This provides greater flexibility in configuring the system, and allows the auxiliary processing unit 24 to choose from among a large variation of terminal mappings in response to changes in the communication system loading. Thus, groupings can be varied in response to pockets of greatest activity. For example, terminals clustered in one area of a warehouse could generate enough transmission activity to warrant a grouping of (2, 4, 256) but a more uniformly distributed transmission activity might warrant a grouping of (4, 512). Each controller 10 in such a system would still include the auxiliary processing unit 24, which would simply be provided with greater limits on the grouping numbers. It should therefore be appreciated that the domain of all data terminals 20 can be mapped into a wide range of groupings.

Figure 6:
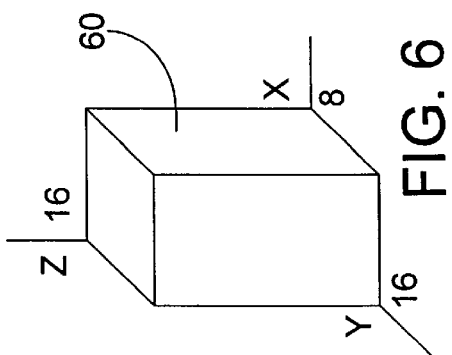
FIG. 6 is a representation of a multivariate data terminal mapping scheme.

A diagrammatic representation of one such multivariate mapping for a system having 2048 data terminals is illustrated in FIG. 6, which shows a mapping of the 2048 terminals with the mapping notation (8, 16, 16) as a box 60 having eight units, or terminals, along one (x) side, sixteen terminals on another (y) side, and sixteen terminals along the remaining (z) side of the box. Changing the mapping of the terminals to terminal groups can be thought of as changing the dimensions of the box. For example, other mappings could be denoted (2, 64, 16), (4, 32, 16), (16, 8, 16), (4, 16, 32), and so on, corresponding to other boxes as long as enough coordinates are provided within the box dimensions to account for all of the terminals.

Previously, a two-dimensional grouping was described in which the mapping changed from a singly-slotted ring of (1, 2048) to (2, 1024), then to (4, 512), and so on up to straight polling of (2048, 1). Because the mapping was carried out in increments of powers of two, the two-dimensional mapping gave twelve steps of groupings. The groupings can be thought of as a set of two-dimensional boxes, from short and tall (1, 2048) to long and thin (2048, 1). As noted above, for a mapping notation (x, y), polling was essentially first selecting the box shape, or group identification number, then selecting a coordinate axis on which to poll (always the x axis in the preferred embodiment described above), and then stepping the polling axis variable (x) through its range to its limit. Likewise, polling in the three-dimensional grouping consists of selecting the box shape, choosing a polling axis, and stepping through the axis value range.

The three-dimensional mapping can be visualized with the help of FIG. 6. As noted, the dimensions of the box defines a particular mapping. A particular terminal group can be defined to be all terminals which share a single value for one of the axes of a particular mapping, such as (x, 16, 16) with x=3, for example. This is analogous to taking a slice of the box. A polling cycle can be defined to be the set of all terminal groups defined by the set of values along a single axis. That is, polling the terminals may be thought of as slicing the mapping box along the x-axis, where all terminals having x=1 in common first contend, and then all terminals having x=2 in common contend, and so on. If more than one axis will be polled, then the polling signal must include bits specifying the polling axis.

It should be appreciated that the 3-dimensional multivariate case can be generalized to an n-dimensional case. The advantage gained by providing such a generalized multivariate mapping of terminals to terminal groups is to increase the number of group choices. That is, for 2048 terminals, a two-dimensional mapping in increments of powers of two provides eleven increments, while a three-dimensional mapping in increments of powers of two provides twenty-two increments (eleven for each axis). Thus, greater flexibility is provided with the provision of multivariate mapping.

The present invention therefore provides an adaptive communication system in which data terminals transmitting over a communication channel are mapped to groups and polled in response to the changing levels of activity in the system. The data terminals can be polled in a protocol like that of either straight polling, pure contention, or intermediate groupings. The controllers in the system account for terminals that leave their areas of responsibility or are switched off, and also account for terminals that enter their areas, thereby eliminating unnecessary polling. The terminals can communicate using several channels, if desired, and will find the first available channel for transmission of data. The invention thereby provides an improved communication system that is more efficient than conventional communication systems that cannot adapt to changes in the loading conditions.

I claim:

1. A method of controlling data transmission in a communication network having a plurality of data terminals capable of transmitting data to and receiving data messages from a controller, the method comprising the steps of:

mapping the data terminals to terminal groups comprising at least one terminal each using a multivariate mapping configuration;

polling a terminal group to thereby provide each data terminal in the group that has a data message to transmit with an opportunity to communicate with the controller and transmit its data message, an unsuccessful attempt occurring when two or more data terminals within a terminal group attempt to transmit data messages in response to a given polling of that group;

for each successful transmission of a data message by each data terminal, accepting data that represents the number of unsuccessful attempts to transmit a data message before the successful transmission;

increasing the number of terminal groups to which the terminals are mapped to a new number of groups if the number of unsuccessful attempts exceeds a predetermined value and decreasing the number of terminal groups to which the terminals are mapped to a new number of groups if the number of unsuccessful attempts is below a predetermined value;

mapping the data terminals to the terminal groups in proportion to the new number of terminal groups; and polling a next terminal group.

2. A method as recited in claim 1, further comprising the step of:

keeping a registry of data terminals that are in active communication with the controller and deleting a data terminal from the registry if a predetermined amount of time has elapsed since the last data transmission from that data terminal.

3. A method as recited in claim 2, wherein the step of increasing and decreasing the number of data terminal groups is performed in increments of powers of two.

4. A method as recited in claim 2, wherein the step of polling each terminal group includes the step of skipping any terminal group with no active terminals on the registry.

5. A communication system comprising:

a plurality of data terminals capable of transmitting and receiving data messages, each data terminal associated with a unique terminal identification number; and terminal mapping means for mapping each data terminal to a terminal group and for dynamically adjusting the number of terminals in a group to be between a predetermined maximum number of terminals and predetermined minimum number of terminals, each data terminal being adapted to respond, if having a data message to transmit, to a polling signal made to the group to which the data terminal is mapped;

wherein an unsuccessful attempt occurs when two or more data terminals within a terminal group attempt to transmit data messages in response to a given polling signal;

wherein each data terminal maintains a count of the number of unsuccessful attempts it has made for each data message transmission and transmits this count to the terminal mapping means when each data message transmission is successfully completed; and wherein the terminal mapping means changes the number of terminals in a group and the number of groups in response to the last count of the number of unsuccessful attempts to transmit a data message that it received from a data terminal.

6. A communication system as recited in claim 5, wherein the terminal mapping means begins operation with a single data terminal group comprising all of the data terminals and, when the number of attempts to transmit data increases to a first predetermined number, increases the number of groups by a factor of two and, when the number of attempts to transmit data decreases to a second predetermined number, decreases the number of groups by a factor of two.

7. A communication system as recited in claim 5, wherein the terminal mapping means maps data terminals to the terminal groups in incremental group sizes of powers of two.

8. A communication system as recited in claim 5, wherein the terminal mapping means maps data terminals to the terminal groups in sequential order of terminal identification number.

9. A communication system as recited in claim 5, wherein each data terminal having a data message to transmit, before responding to the polling signal made to the group to which the data terminal is mapped, checks for data message transmissions from other data terminals and transmits its data message only if no data message transmissions from other data terminals are detected.

10. A communication system as recited in claim 5, wherein:

the predetermined maximum number of terminals in each group corresponds to the total number of data terminals; and the predetermined minimum number of terminals in each group is one.

11. A communication system as recited in claim 5, wherein the terminal mapping means provides a multivariate mapping of terminals to terminal groups, the terminal groups being specified by a multiple coordinate system.

12. A communication system comprising:

a plurality of data terminals capable of transmitting and receiving data messages, each data terminal associated with a unique terminal identification number; and terminal mapping means for mapping each data terminal to a terminal group and for dynamically adjusting the number of terminals in a group to be between a predetermined maximum number of terminals and predetermined minimum number of terminals, each data terminal being adapted to respond, if having a data message to transmit, to a polling signal made to the group to which the data terminal is mapped;

wherein an unsuccessful attempt occurs when two or more data terminals within a terminal group attempt to transmit data messages in response to a given polling signal;

wherein each data terminal maintains a count of the number of unsuccessful attempts it has made for each data message transmission, each data message including the unsuccessful attempt count and further including data generated by a terminal user;

wherein the unsuccessful attempt count is transmitted to the terminal mapping means when each data message transmission is successfully completed; and wherein the terminal mapping means changes the number of terminals in a group and the number of groups in response to the last count of the number of unsuccessful attempts to transmit a data message that it received from a data terminal.

13. A communication system as recited in claim 12, wherein each data terminal having a data message to transmit, before responding to the polling signal made to the group to which the data terminal is mapped, checks for data message transmissions from other data terminals and transmits its data message only if no data message transmissions from other data terminals are detected.

14. A communication system as recited in claim 12, wherein the terminal mapping means begins operation with a single data terminal group comprising all of the data terminals and, when the number of attempts to transmit data increases to a first predetermined number, increases the number of groups by a factor of two and, when the number of attempts to transmit data decreases to a second predetermined number, decreases the number of groups by a factor of two.

15. A communication system as recited in claim 12, wherein the terminal mapping means maps data terminals to the terminal groups in incremental group sizes of powers of two.

16. A communication system as recited in claim 12, wherein the terminal mapping means maps data terminals to the terminal groups in sequential order of terminal identification number.

17. A communication system as recited in claim 12, wherein:

the predetermined maximum number of terminals in each group corresponds to the total number of data terminals; and the predetermined minimum number of terminals in each group is one.

18. A communication system comprising:

a plurality of data terminals capable of transmitting and receiving data messages, over a data channel, each terminal being associated with a unique terminal identification number and with a terminal group;

wherein each data terminal includes a radio transmitter/receiver, means for keeping a count of the number of attempts the radio transmitter/receiver has made to transmit a data message, and an auxiliary processing unit that controls the radio transmitter/receiver and determines when the terminal group with which the data terminal is associated is being polled, such that the terminal attempts to transmit its data message if its terminal group is being polled and does not attempt to transmit its data message otherwise; and terminal mapping means for dynamically partitioning the set of all terminal identification numbers into the terminal groups and mapping each terminal identification number to one of the terminal groups, and for sequentially granting access to the data channel for each one of the terminal groups during a polling cycle, such that any data terminal in the polled terminal group can contend with other data terminals in the group to transmit data messages in that polling time interval, and such that a polling cycle is completed after all of the terminal groups have been given a chance to contend for access to the data channel;

wherein the terminal mapping means receives the count of data message transmission attempts with each data message transmission from a data terminal and changes the dimensions of the terminal groups in response to the count of data message transmission attempts received.

19. A communication system as recited in claim 18, wherein the controller keeps a list of active terminals with which it is in communication, active terminals being defined to be those terminals from which the controller has received a data message within an active-indicating interval, the controller deleting terminals from its active list if it has not received a data message within the active-indicating interval.

20. A communication system as recited in claim 19, wherein the controller follows each polling cycle by issuing a terminal log-in polling signal, thereby defining a log-in interval during which time a data terminal can send the controller a log-in data message containing its terminal identification number if the data terminal has not already done so, and in response to which the controller adds the terminal to its list of active terminals, thereby logging-in the terminal.

21. A communication system as recited in claim 20, wherein a data terminal that cannot communicate with the controller after a predetermined time interval responds to a log-in data message by attempting to log-in with a controller.

22. A communication system as recited in claim 21, wherein the data terminal attempts to log-in with a controller by waiting for a polling log-in signal and responding with a log-in message.

23. A communication system as recited in claim 20, wherein the controller includes:

an RF control module that determines the number of groups into which the data terminals will be divided;

a control network module that provides communication between the controller and other controllers;

a host control module that facilitates communication between the controller and a host computer; and a communication server that passes communication and processing control of the controller among the RF control module, the control network module, and the host control module.

24. A communication system as recited in claim 23, wherein each data terminal comprises:

a main processing unit;

a radio transmitter/receiver;

an auxiliary processing unit that controls the radio transmitter/receiver and determines if the terminal group to which the terminal is mapped is being polled by the controller, and attempts to transmit data if its group is being polled and does not attempt to transmit data otherwise.

25. A communication system as defined in claim 18, wherein the terminal mapping means changes the terminal partitioning to define an n-dimensional mapping, where n is greater than 2.

26. A communication system having a plurality of data terminals capable of transmitting and receiving data over a data channel, each terminal being associated with a unique terminal identification number, and at least one controller that includes terminal mapping means for dynamically partitioning a set of data terminals into a plurality of groups and mapping each terminal identification number into one of the groups, and for sequentially polling each one of the groups during a polling cycle and completing a polling cycle after all of the groups have been polled; wherein the terminal mapping means partitions the set of terminals using a multivariate mapping and sequentially polls the groups by polling along one of the dimensions at a time to allow the terminals within a sub-group to contend with the other terminals to transmit data.

* * * * *